United States Patent
Yang

(10) Patent No.: US 10,525,406 B2
(45) Date of Patent: Jan. 7, 2020

(54) POLYMER BLENDED MEMBRANES FOR SOUR GAS SEPARATION

(71) Applicant: Saudi Arabian Oil Company, Dhahran (SA)

(72) Inventor: Junyan Yang, Acton, MA (US)

(73) Assignee: Saudi Arabian Oil Company, Dhahran (SA)

(*) Notice: Subject to any disclaimer, the term of this patent is extended or adjusted under 35 U.S.C. 154(b) by 177 days.

(21) Appl. No.: 15/608,403

(22) Filed: May 30, 2017

(65) Prior Publication Data

US 2018/0345211 A1    Dec. 6, 2018

(51) Int. Cl.
| | | |
|---|---|---|
| *B01D 53/22* | (2006.01) | |
| *B01D 67/00* | (2006.01) | |
| *B01D 71/52* | (2006.01) | |
| *B01D 71/56* | (2006.01) | |
| *B01D 71/80* | (2006.01) | |

(52) U.S. Cl.
CPC ....... *B01D 53/228* (2013.01); *B01D 67/0002* (2013.01); *B01D 67/009* (2013.01); *B01D 67/0016* (2013.01); *B01D 71/52* (2013.01); *B01D 71/56* (2013.01); *B01D 71/80* (2013.01); *B01D 2256/245* (2013.01); *B01D 2257/504* (2013.01); *B01D 2323/08* (2013.01); *B01D 2323/12* (2013.01); *B01D 2323/30* (2013.01); *B01D 2323/345* (2013.01); *B01D 2325/22* (2013.01); *B01D 2325/24* (2013.01); *B01D 2325/32* (2013.01)

(58) Field of Classification Search
CPC .............. B01D 53/228; B01D 67/0002; B01D 67/0016; B01D 67/009; B01D 71/52; B01D 71/56; B01D 71/80; B01D 2323/08; B01D 2323/12; B01D 2323/30; B01D 2323/345
See application file for complete search history.

(56) References Cited

U.S. PATENT DOCUMENTS

| | | |
|---|---|---|
| 7,166,649 B2 | 1/2007 | Day et al. |
| 7,357,864 B2 | 4/2008 | Takada et al. |
| 8,232,324 B2 | 7/2012 | Ohba et al. |
| 8,252,475 B2 | 8/2012 | Kobuchi et al. |
| 8,317,900 B2 | 11/2012 | Peinemann et al. |
| 8,519,048 B2 | 8/2013 | Bentley et al. |
| 9,005,726 B2 | 4/2015 | Matsubara et al. |
| 9,446,562 B2 | 9/2016 | Sharygin et al. |
| 9,452,618 B2 | 9/2016 | Makuta |
| 2005/0130397 A1 | 6/2005 | Bentley et al. |
| 2005/0187338 A1 | 8/2005 | Ohba et al. |
| 2009/0221767 A1* | 9/2009 | Malet ........... B01D 53/228 525/92 A |
| 2011/0077334 A1 | 3/2011 | Oi et al. |
| 2014/0080936 A1 | 3/2014 | Kim et al. |
| 2016/0096142 A1 | 4/2016 | Harris et al. |
| 2016/0096144 A1 | 4/2016 | Harris et al. |
| 2016/0254559 A1 | 9/2016 | Nakano et al. |
| 2016/0285120 A1 | 9/2016 | Nakano et al. |

FOREIGN PATENT DOCUMENTS

| | | |
|---|---|---|
| CN | 106621864 A | 5/2017 |
| EP | 0271831 A2 | 6/1988 |
| EP | 1772918 A1 | 4/2007 |
| EP | 2679254 A1 | 1/2014 |
| JP | 2013122144 A1 | 5/2015 |
| WO | 2005105857 A1 | 11/2005 |
| WO | 2007072139 A2 | 6/2007 |
| WO | 2013047491 A1 | 4/2013 |
| WO | 2014118382 A1 | 8/2014 |
| WO | 2014168393 A1 | 10/2014 |
| WO | 2015040143 A1 | 3/2015 |
| WO | 2016054367 A1 | 4/2016 |

OTHER PUBLICATIONS

Ghadimi, Ali et al., "Preparation of alloyed poly(ether block amide)/poly(ethylene glycol diacrylate) membranes for separation of CO2/H2 (syngas application)", Journal of Membrane Science, 458, 2014, pp. 14-26. (Year: 2014).*
Sridhar, S. et al., "Development of crosslinked poly(ether-block-amide) membrane for CO2/CH4 separation", Colloids and Surfaces, 297, 2007, pp. 267-274. (Year: 2007).*
Lin, Haiqing et al., "Transport and structural characteristics of crosslinked poly(ethylene oxide) rubbers", Journal of Membrane Science, 276, 2006, pp. 145-161. (Year: 2006).*
Scholes, Colin A. et al., "Crosslinked PEG and PEBAX Membranes for Concurrent Permeation of Water and Carbon Dioxide", Membranes, 6, 2016, 10 pages. (Year: 2016).*
International Search Report and Written Opinion pertaining to PCT/US2018/024299 dated Jun. 19, 2018.

(Continued)

*Primary Examiner* — Jason M Greene
(74) *Attorney, Agent, or Firm* — Dinsmore & Shohl, LLP

(57) ABSTRACT

A method of separating gas and a method of making a gas separation membrane. The method of separating gas includes flowing a gas stream through a membrane, in which the membrane comprises a crosslinked mixture of a poly (ether-b-amide) copolymer and an acrylate-terminated poly (ethylene glycol) according to formula (I) or formula (II); and separating the gas stream via the membrane.

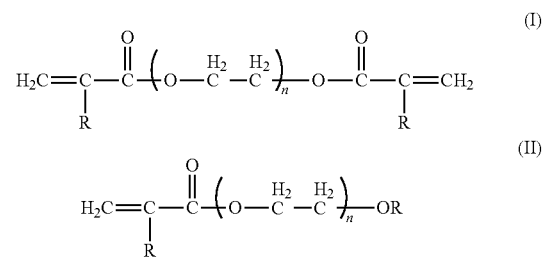

In formulas (I) and (II), each n is of from 2 to 30; and each R is independently —H or —$CH_3$.

15 Claims, 9 Drawing Sheets

(56) References Cited

OTHER PUBLICATIONS

Ghadimi et al., "Preparation of Alloyed Poly(either block amide)/poly(ehtylene glycol diacrylate) Membranes for Separation of CO2/H2 (syngas application)", Journal of Membrane Science, 2014, 458, 14-26.

Kalakkunnath et al., "Segmental Relaxation Characteristics of Cross-Linked Poly(ethylene oxide) Copolymer Networks", Macromolecules, 2005, 38, 9679-9687.

Lin et al., "Transport and Structural Characteristics of Crosslinked Poly(ethylene oxide) Rubbers", Journal of Membrane Science, 2006, 276, 145-161.

Sridhar et al., "Developement of Crosslinked Poly(ether-block-amide) Membrane for CO2/CH4 Separation", Colloids and Surfaces A: Physiochem. Eng. Aspects, 2007, 297, 267-274.

Asghari et al., "Effect of polyethyleneglycol on CH4 permeation through poly(amid-b-ethelyne oxide)-based nanocomposite membranes", Applied Surface Science, 2014, 318, 218-222, Elsevier B.V.

Barillas et al., "The CO2 permeability and mixed gas CO2/H2 selectivity of membranes composed of CO2-philic polymers", Journal of Membrane Science, 2011, 372, 29-39, Elsevier B.V.

Car et al., "Pebax/polyethylene glycol blend thin film composite membranes for CO2 separation: Performance with mixed gases", Separation Purification Technology Science, 2008, 62, 110-117, Elsevier B.V.

Car et al., "PEG modified poly(amide-b-ethylene oxide) membranes for Co2 separation", Journal of Membrane Science, 2008, 307, 88-95, Elsevier B.V.

Feng et al., "Poly(amide-12-b-ethylene oxide)/polyethylene glycol blend membranes for carbon dioxide separation", Separation and Purification Technology, 2013, 116, 25-34, Elsevier B.V.

George et al., "Polymer membranes for acid gas removal from natural gas", Separation and Purification Technology, 2016, 158, 333-356, Elsevier B.V.

Ghadimi et al., Preparation of alloyed poly(ether block amid)/poly(ethylene glycol diacrylate) membranes for separation of Co2/H2 (syngas application), Journal of Membrane Science, 2014, 458, 14-26, Elsevier B.V.

Lilleparg et al., "Stability of blended polymeric materials for CO2 separation", Journal of Membrane Science, 2014, 467, 269-278, Elsevier B.V.

Lin et al., "Transport and structural characteristics of crosslinked poly(ethylene oxide) rubbers", Journal of Membrane Science, 2006, 276, 145-161, Elsevier B.V.

Lin et al., The Effect of Cross-Linking of Gas Permeability in Cross-Linked Poly(Ethylene Glycol Diacrylate), Macromolecules, 2005, 38, 8381-8393, American Chemical Society.

Liu et al., "Recent progress in the design of advanced PEO-containing membranes for CO2 removal", Progress in Polymer Science, 2013, 38, 1089-1120, Elsevier Ltd.

Rabiee et al., "CO2 separation performance of poly(ether-b-amide6)/PTMEG blended membranes: Permeation and sorption properties", Chemical Engineering Research and Design, 2015, 98, 96-106, Elsevier B.V.

Yave et al., "Nanostructured membrane material designed for carbon dioxide separation", Journal of Membrane Science, 2010, 350, 124-129, Elsevier B.V.

Yave et al., "Gas permeability and free volume in poly(amide-b-ethylene oxide)/polyethylene glycol blend membranes" Journal of Membrane Science, 2009, 339, 177-183, Elsevier B.V.

\* cited by examiner

POLYMER BLENDED MEMBRANES FOR SOUR GAS SEPARATION

TECHNICAL FIELD

Embodiments of the present disclosure generally relate to membranes of crosslinked poly(ethylene glycol) and poly(amide-b-ether), methods of making the membranes, and methods of separating gas streams with the membranes.

BACKGROUND

Natural gas is an energy source that may decrease the reliance on liquid fuel for power generation. However, many natural gas reservoirs contain a complex mixture of acid gases (e.g., carbon dioxide, and hydrogen sulfide), higher value heavy hydrocarbons, inert gases, and trace components of many other compounds. In many natural gas reserves, carbon dioxide ($CO_2$) and hydrogen sulfide ($H_2S$) can be present in the high quantities. At high concentrations, $CO_2$ or $H_2S$ in combination with water is corrosive, and, therefore, can destroy pipelines or other equipment. Furthermore, the presence of $CO_2$ reduces the heating value of natural gas. Therefore, natural gas from natural gas reservoirs or "produced gas" is processed prior to distribution and usages. The bulk removal of these gases will decrease the post-membrane treatment units (such as acid gas amine scrubbing and cryogenic condensation) and will increase the feed gas quality and flow.

Membrane technology has become an essential alternative for efficient gas separation process. Due to the manufacturability, low material costs, robust physical characteristics, and good intrinsic transport properties, as compared to the conventional method for acid gas separation (for example, acid gas amine scrubbing), polymeric membranes are of great research interest in the membrane technology field. However, polymeric membranes designed for gas separations are known to have a trade-off between permeability and selectivity. In addition, there are other significant material challenges, such as physical aging and plasticization.

Glassy polymers, such as cellulose acetate (CA), polyimide PI), and polysulfone (PSF), are used for sour gas removal from natural gas, due to their high thermal stability. CA polymer membranes may be used for $CO_2$ separation and exhibit high pure gas carbon dioxide/methane ($CO_2/CH_4$) selectivity of approximately 30. However, due to easy plasticization at high $CO_2$ pressure or in the presence of significant amounts of higher-hydrocarbon contaminants, glassy polymers, such as CA, exhibit much lower $CO_2/CH_4$ mixed gas selectivities and exhibit very low $CO_2$ permeability (approximately 5 Barrer=$3.75 \times 10^{-17}$ $m^2 \cdot s^{-1} \cdot Pa^{-1}$), which does not meet some industrial requirements. Similarly, another commercially available polyimide exhibits higher $CO_2/CH_4$ pure gas selectivity of 40, but still much lower $CO_2$ permeability of less than 12 Barrer (=$9.00 \times 10^{-17}$ $m^2 \cdot s^{-1} \cdot Pa^{-1}$).

SUMMARY

Ongoing needs exist to obtain a polymer membrane having a high $CO_2$ permeability, high thermal stability, and high $CO_2/CH_4$ pure gas selectivity. This disclosure provides a membrane which achieves a high $CO_2$ permeability, high thermal stability, a resistance to plasticization, and high $CO_2/CH_4$ pure gas selectivity.

One or more embodiments of this disclosure include a method of separating gas and a method of making a gas separating membrane. In embodiments, the method for separating gas includes flowing a gas stream through a membrane, in which the membrane comprises a crosslinked mixture of a poly(ether-b-amide) (PEBA) copolymer and an acrylate-terminated poly(ethylene glycol) according to formula (I) or formula (II); and separating the gas stream via the membrane.

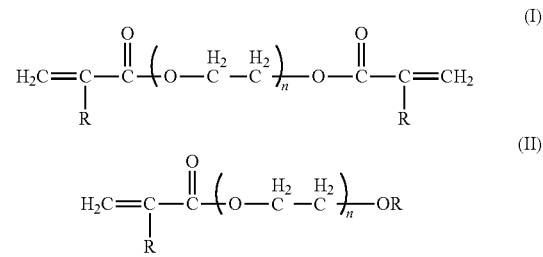

In formulas (I) and (II), each n is of from 2 to 30; and each R is independently —H or —$CH_3$.

Some embodiments include a method of making a gas separation membrane. In embodiments, the method of making a gas separation membrane includes dissolving a polyether block amide copolymer, an acrylate-terminated poly(ethylene glycol) according to formula (I) or formula (II), and a photoinitiator in a solvent to form a polymer solution; casting the polymer solution into a mold; removing the solvent to form a film; and exposing the film to a photoactivator to form the gas separation membrane.

BRIEF DESCRIPTION OF FIGURES

FIGS. 3A and 3B are stacked Differential Scanning calorimetry (DSC) thermographs as a function of temperature in degrees Celsius (° C.), in which: FIG. 3A depicts stacked heating curves and FIG. 3B depicts stacked cooling curves of: (3) neat Pebax®; (2) Pebax®/PEGDA; and (1) Pebax®/XLPEGDA membranes.

DETAILED DESCRIPTION

Figure 1A:
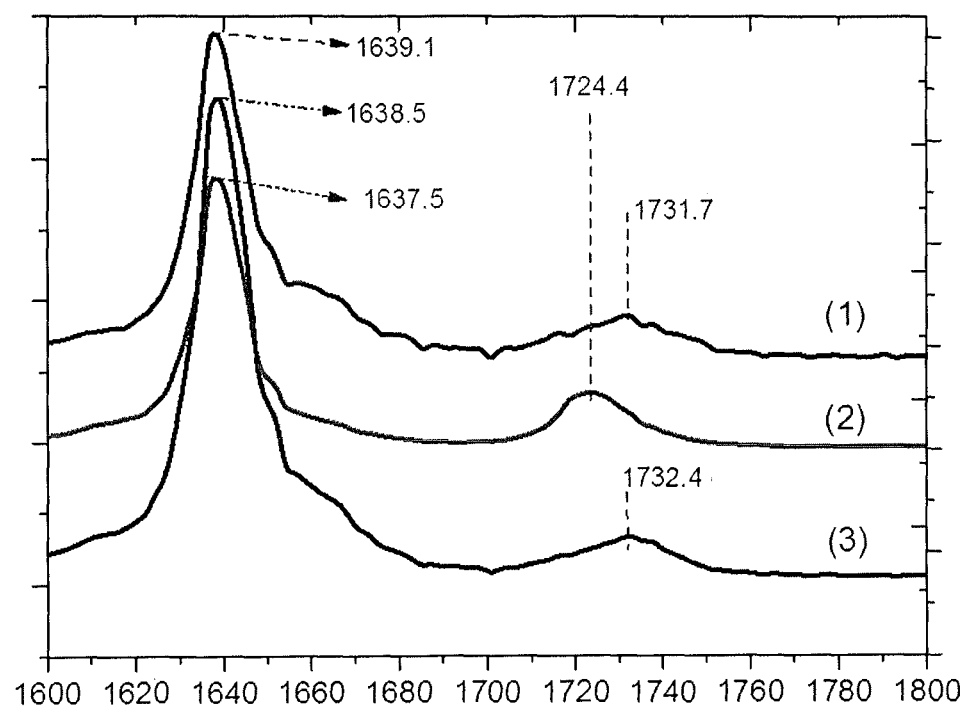
FIGS. 1A, 1B and 1C are stacked Fourier transform infrared (FTIR) spectra (intensity as a function of wavenumber ($cm^{-1}$)) of: (3) neat Pebax®, a PEBA copolymer; (2) Pebax® and poly(ethylene glycol) diacrylate (PEGDA); and (1) Pebax® and cross-linked PEGDA (XLPEGDA) membranes.

Embodiments of the present disclosure are directed to membranes produced by crosslinking polymer mixtures of acrylate-terminated poly(ethylene glycol) polymers and poly(ether-b-amide) copolymers, methods of making the membranes, and methods of separating produced gas using these membranes, where the membranes have improved selectivity separating hydrocarbons and greenhouse gases, such as carbon dioxide and methane.

In some embodiments, a gas separation membrane includes a mixture of poly(ether-b-amide) copolymer and acrylate-terminated poly(ethylene glycol) (PEG), in which the acrylate-terminated poly(ethylene glycol) is cross-linked with another acrylate-terminated poly(ethylene glycol) polymer strand. The acrylate-terminated PEG may include polymers according to formulas (I) or (II):

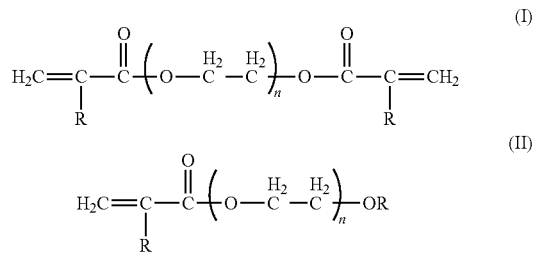

In formulas (I) or (II), each R is independently a —$CH_3$ (methyl) or —H (hydrogen radical), and subscript n is an integer from 2 to 30. In some embodiments, the subscript n is an integer from 2 to 14.

In one or more embodiments, methods of making a gas separation membrane include dissolving a poly(ether-b-amide) (PEBA) copolymer, an acrylate-terminated PEG according to formula (I) or formula (II), and a photoinitiator in a solvent to form a polymer solution. By incorporating and crosslinking acrylate-terminated PEG chains within PEBA polymer solution, interpenetrating polymer networks are formed. The polymer solution is casted or placed in a mold. In some embodiments, the polymer solution is casted at a temperature from 30° C. to 80° C. Once the solvent is removed, a film is formed. The film may optionally be removed from the mold. The film is then exposed to a photoactivator to form the gas separation membrane. The gas separation membrane optionally may be cured.

The term "terminated" as used in "acrylate-terminated" refers to a carbon-carbon double bond in which one of the carbon atoms in the double bond is at the end of the chain, and therefore is bonded to two hydrogen atoms.

In some embodiments, the poly(ether-b-amide) (PEBA) copolymer can include a soft segment of from 60% to 80% by weight and a hard segment of from 40% to 20% by weight. Such polymers are available commercially as various grades such as Pebax® 1657, 1074, 5513, 2533, and 3000 etc. from Arkema, Inc., Dammam, Kingdom of Saudi Arabia. In some embodiments, the poly(ether-b-amide) block copolymer is Pebax 1657.

In some embodiments, the acrylate-terminated PEG according to formula (I) or formula (II), have 2 to 30 ethylene oxide repeating units (n is 2 to 30) or 2 to 14 ethylene oxide repeating units (n is 2 to 14). The term "ethylene oxide repeating units" refers to the —($OCH_2CH_2$)— or —($CH_2CH_2O$)— in formula (I) and formula (II). In some embodiments, the acrylate-terminated PEG has a weight average molecular weight of approximately 500 grams per mole (g/mol) to 1000 g/mol, 600 to 900 g/mol, or approximately 700 g/mol.

The two types of polymers, the PEBA and the acrylate-terminated PEG, are dissolved in a solvent and mixed at a temperature from 70° C. to 100° C. The solvent may be a mixture of various solvents such as water; alcohol; dimethylfuran; dimethylacetamide; and dimethyl sulfoxide (DMSO). In one or more embodiments, the solvent is a mixture of water and alcohol. When the solvent in a mixture of water and alcohol, the water is deionized water and the alcohol may be chosen from ethanol, methanol, propanol, iso-propanol, butanol, or combinations thereof. In one or more embodiments, the alcohol is ethanol. In some embodiments, the alcohol to water ratio by volume may be from 60/40 to 80/20. In other embodiments, the volume of water is from 65% to 75%, and the volume of alcohol is from 25% to 35%. In a specific embodiment, the solvent is approximately 60/40 to 80/20 (volume/volume) ethanol to deionized water. In another specific embodiment, the solvent is approximately 70/30 (volume/volume) ethanol to deionized water.

Once the PEBA and acrylate-terminated PEG are dissolved in the alcohol and water solvent, a polymer solution is formed. In some embodiments, the polymer solution includes from 1.0 weight percent per volume (wt. %/v) to 10 wt. %/v concentration poly(ether-b-amide), in which the volume is measure in milliliters (or in which the concentration is measured in grams per milliliters and from of acrylate-terminated PEG based on the total weight PEBA. In some embodiments, the polymer solution includes from 2.0 wt. %/v to 5 wt. %/v of poly(ether-b-amide) or the polymer solution contains about 4.0 wt. %/v of poly(ether-b-amide).

In some embodiments, the photoinitiator may include ketone compositions such as 1-hydroxycyclohexyl phenyl ketone (HCPK) or benzophenone. The photoinitiator may be added in amounts of from 0.5 wt. % to 5.0 wt. %, 0.5 wt. % to 3.0 wt. %, or 1.0 wt. % to 2 wt. % based on the total weight of the acrylate-terminated PEG.

In one embodiment, the film is exposed to a photoactivator to facilitate crosslinking and thereby form the gas separation membrane. The photoactivator can be any light source that activates the photoinitiator and causes the photoinitiator to react with the acrylate-terminated PEG. In some embodiments, the photoactivator is ultraviolet light at a wavelength of from 300 nm to 350 nm or 315 nm to 320 nm. In one or more embodiments, the film is exposed to ultraviolet light of 318 nm. The exposure time may range from 30 seconds to 300 seconds or from 90 seconds to 180 seconds. The light intensity may vary from 11,000 mW/cm² to 12,000 mW/cm² (milliwatt per centimeters squared).

In another embodiment of this disclosure, methods of separating gas include flowing a gas stream through a membrane and separating the gas stream through the membrane produced from the crosslinked mixture of the polyether block amide copolymer and the acrylate-terminated poly(ethylene glycol) according to formula (I) or formula (II) detailed above.

The gas stream may include methane, carbon dioxide, and other sour gas components, which includes natural gases with a significant amount of hydrogen sulfide ($H_2S$). Carbon dioxide ($CO_2$) is at least 24 times more permeable through the gas separation membrane than methane.

In addition to the increase of $CO_2$ permeability, the gas separation membrane has other structural benefits. For examples, as the pressure increase, the $CO_2$ permeability does not increase as much as other gas separation membrane and has approximately 50% less $CO_2$ permeability increase. This indicates that the gas separation membrane of this disclosure is more plasticization resistant. Additionally, the gas separation membrane does not swell or leech in comparison to non-crosslinked membranes having similar composition. In some embodiments, the gas separation membrane achieves a greater than 100% reduction in weight loss than uncrosslinked poly(ether-b-amide) copolymers. In other embodiments, the gas separation membrane achieves a greater than 250%, 500%, 750% or 1000% reduction in weight loss than uncrosslinked poly(ether-b-amide) copolymers.

Since the gas separation membrane does not swell or leech, a sustainable flux may be maintained. A constant feed pressure and permeate pressure are one of key operating parameters. If membrane's composition (such as loss low MW polymer) and geometry (such as thickness changed under higher pressure) are changed during the operation for months, or years, than the gas plant has to adjust pressure frequently to maintain stable permeability (flux).

EXAMPLES

The following examples illustrate one or more additional features of the present disclosure described previously. It should be understood that these examples are not intended to limit the scope of the disclosure or the appended claims in any manner.

Inventive Example 1

Preparation of Poly(amide-b-ether) Pebax/XLPEGDA Membranes

Pebax 1657 was dried in a vacuum oven at 60° C. for 24 hours. A sample of 0.8 g of dried Pebax 1657 was dissolved in a mixture of 20 mL (4 wt. %/v) ethanol/deionized (DI) water (70/30 v/v). The reaction mixture was vigorously stirred at 85° C. under reflux for at least 6 hour to obtain a homogeneous solution. The Pebax polymers were obtained from Arkema Inc. After Pebax was completely dissolved, different amounts according to Table 1 of polyethylene glycol diacrylate (PEGDA) (750 g/mol) ranging from 1 weight percent (wt %) to 80 wt % (prefer in the range of 5 wt % to 80 wt %) based upon the weight of Pebax 1657 were added into Pebax solution and mechanical stirred at 60° C. for another 2 hours to make sure that the polymeric solution is completed homogeneous. An 2 wt. % based on the weight of the PEGDA (see Table 1 for specific amounts) of HCPK (1-hydroxycyclohexyl(phenyl)methanone bis[2-(1-hydroxycyclohexyl)phenyl]methanone photoinitiator) based on PEGDA was added into the solution and mechanical stirred at 60° C. for 2 hours.

TABLE 1

| Variable Amounts of PEGDA and Photoinitiator | | | | |
|---|---|---|---|---|
| Pebax weight | Ethanol/H2O (70/30) | PEGDA weight (based on weight of Pebax) | | 2 wt % HCPK (based on weight of PEGDA) |
| 0.8 g | 20 mL | 5% | 0.04 g | 0.8 mg |
| 0.8 g | 20 mL | 10% | 0.08 g | 1.6 mg |
| 0.8 g | 20 mL | 20% | 0.16 g | 3.2 mg |
| 0.8 g | 20 mL | 40% | 0.32 g | 6.4 mg |
| 0.8 g | 20 mL | 60% | 0.48 g | 9.6 mg |
| 0.8 g | 20 mL | 80% | 0.64 g | 12.8 mg |

The obtained mixture was used to prepare the dense film after gas bubbles were removed from the prepared polymer mixture. The solution was poured within pre-heated (50 to 60° C.) polytetrafluoroethylene (PTFE) flat-bottomed Petri dishes. The dense film was dried at room temperature overnight for solvent evaporation. Then it was removed from PTFE Petri dishes for further crosslinking.

The obtained Pebax/PEGDA membranes were photopolymerized by exposure to 318 nm UV light in a UV Crosslinker device (Model 13-245-221, Fisher Scientific) for 30 seconds to 300 seconds. The crosslinked membranes were placed in a vacuum oven for further drying at 40° C. to 60° C. for at least 48 hours. The average thickness of the dense film was 30 to 70 μm.

Comparative Membrane 1

Preparation of Poly(Amide-b-Ether) (Pebax) Membrane

Pebax 1657 was dried in a vacuum oven at 60° C. for 24 hours. A sample of 0.8 g of dried Pebax 1657 was dissolved in a mixture of 20 mL ethanol/deionized (DI) water (70/30 v/v). The reaction mixture was vigorously stirred at 85° C. under reflux for at least 6 hour to obtain a homogeneous solution. The obtained Pebax solution was placed at 50-60° C. to remove gas bubbles and then was poured within pre-heated (50 to 60° C.) polytetrafluoroethylene (PTFE) flat-bottomed Petri dishes to prepare the dense film. The dense film was dried at room temperature overnight with a cover for solvent evaporation, and then dried in a vacuum oven at 60° C. for 48 hr. Subsequent to that the membranes were easily peeled off the Petri dishes for permeation testing.

Comparative Membrane 2

Preparation of Blended Poly(Amide-/β-Ether)Membranes (Pebax/PEGDA)

Pebax 1657 was dried in a vacuum oven at 60° C. for 24 hours. A sample of 0.8 g of dried Pebax 1657 was dissolved in a mixture of 20 mL ethanol/deionized (DI) water (70/30 v/v). The reaction mixture was vigorously stirred at 85° C. under reflux for at least 6 hour to obtain a homogeneous solution.

After Pebax was completely dissolved, different amounts of polyethylene glycol diacrylate (PEGDA) (MW=750) ranging from 5 weight percent (wt %) to 80 wt % (prefer in the range of 5 wt % to 80 wt %) based upon the weight of Pebax 1657 were added into Pebax solution and mechanical stirred at 60° C. for another 2 hours to make sure that the polymeric solution is completed homogeneous.

The obtained Pebax/PEGDA mixture was placed at 50-60° C. to remove gas bubbles and then was poured within pre-heated (50 to 60° C.) polytetrafluoroethylene (PTFE) flat-bottomed Petri dishes to prepare the dense film. The dense film was dried at room temperature overnight with a cover for slow solvent evaporation, and then dried in a vacuum oven at 60° C. for 48 hr. Subsequent to that the membranes were easily peeled off the Petri dishes for permeation testing.

Studies

Figure 1B:
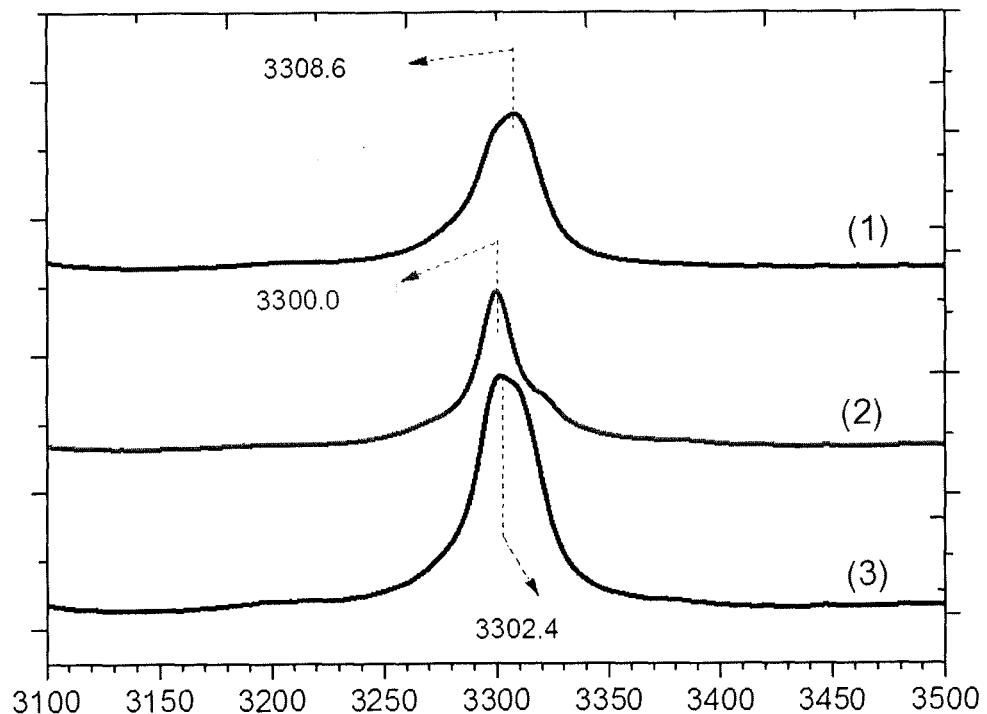
Figure 1C:
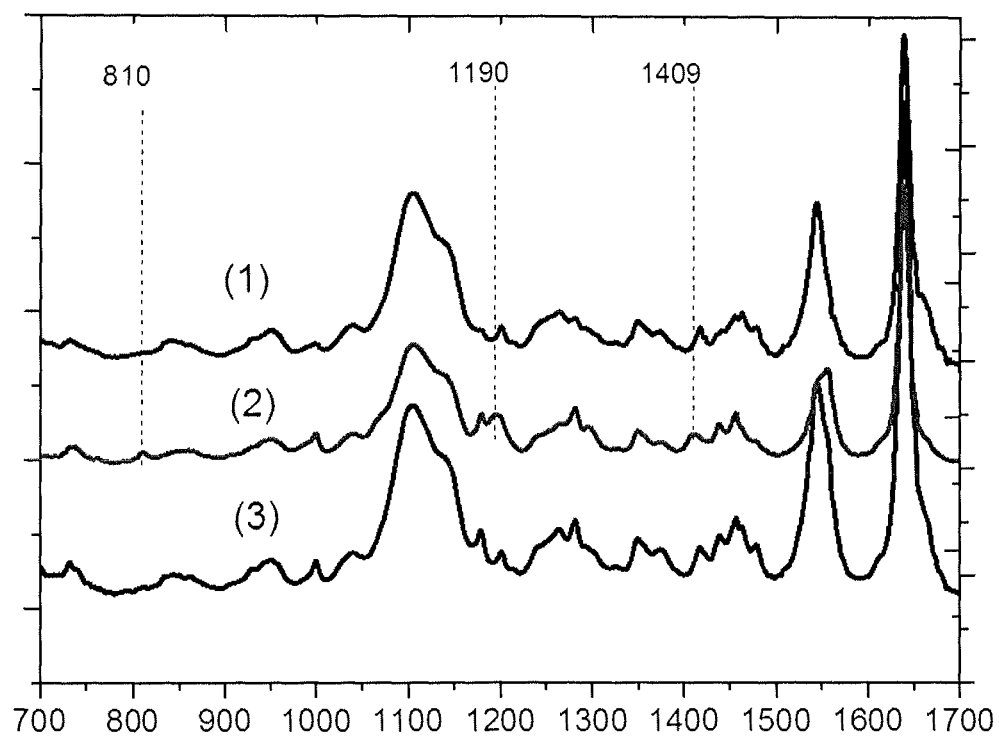

The successful synthesis of Pebax/XLPEGDA blended membranes and completion of crosslinking reaction of PEGDA was confirmed by Fourier Transform Infrared—Attenuated Total Reflection (FTIR-ATR) spectroscopy (see FIGS. 1A-1C). Three membranes were studied: Comparative Example 3 (neat Pebax); Comparative Example 2 (Pebax/un-crosslinked PEGDA (Pebax/PEGDA)), and Inventive Example 1 (Pebax/XLPEGDA). The polyamide segment of Pebax showed several characteristic peaks around 1099 $cm^{-1}$, 1640 $cm^{-1}$, 1731 $cm^{-1}$ and 3293 $cm^{-1}$ that are attributed to —C—O—C, H—N=O, O—C=O and —N—H functional groups. The PEGDA showed characteristics of a plasticizer behavior in that a plasticizer decreases intermolecular forces such as hydrogen bonding (H-bonding). In FIGS. 1A-1B, the characteristic peak relating to O—C=O and —N—H shifted to lower wavenumbers, from 1732 $cm^{-1}$ and 3302 $cm^{-1}$ for Pebax 1657 to around 1724 $cm^{-1}$ and 3300 $cm^{-1}$ for Pebax/PEGDA. The shift indicated that the intramolecular H-bonding between the N—H, in the polymer amide segments, and oxygen atoms, in the PEO, diminished. Thereby, PEGDA showed plasticizer behavior in the polymer matrix that leads to weakening of H-bonding and lower crystallinity in membranes.

In FIG. 1C, the characteristic acrylic absorptions for the Pebax/PEGDA blended membranes (1409 $cm^{-1}$, 1190 $cm^{-1}$, 810 $cm^{-1}$) are marked with a dotted line, which disappeared after UV crosslinking in the Pebax/XLPEGDA blended membranes. The disappearance indicated that the double bonds in the acrylate reacted, which lead to the formation of crosslinked PEG structures and further formation of interpenetrating polymer networks in the polymer membrane matrix.

Figure 2:
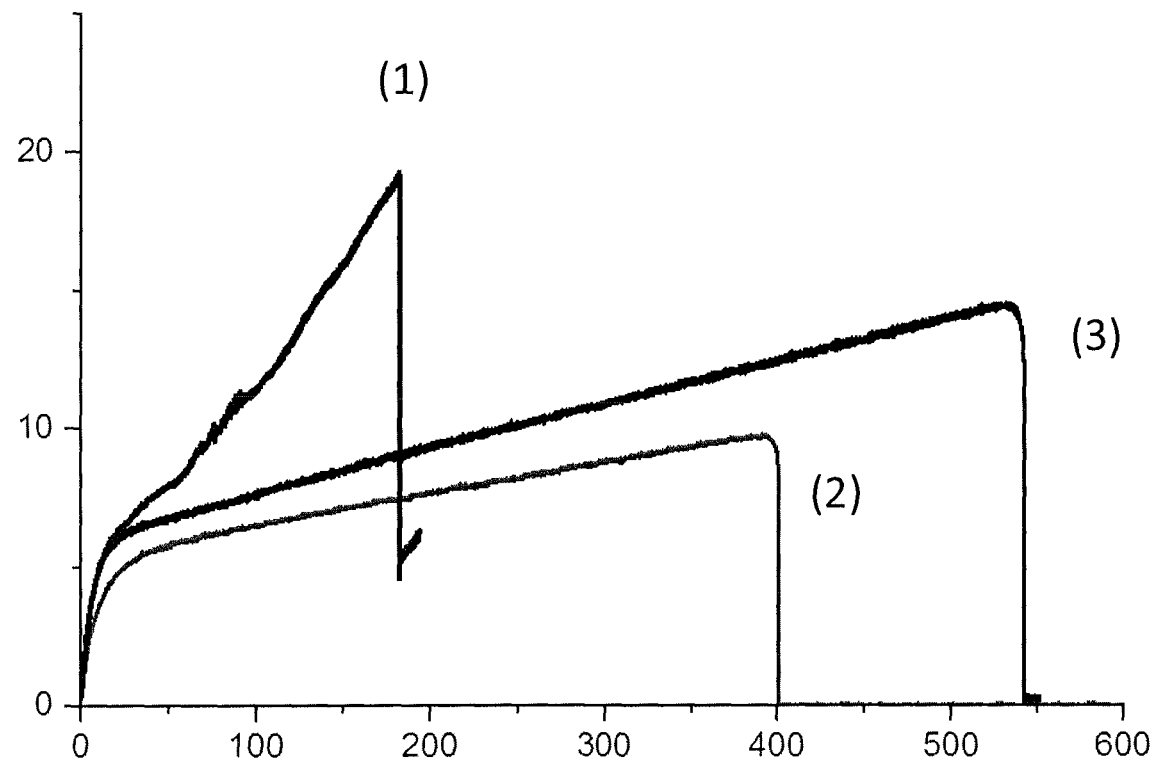
FIG. 2 is the graph of tensile stress in megapascals (mPa) as a function of tensile strain (%) of: (3) neat Pebax®; (2) Pebax®/PEGDA; and (1) Pebax®/XLPEGDA membranes.

The membrane mechanical properties (such as tensile strength and elongation) were characterized by Universal Instron device. In FIG. 2, the stress-strain curves were plotted and results are summarized in Table 2. The Pebax/XLPEGDA membranes demonstrated significantly increase in tensile strength (e.g., a 51% increase and a 96% increase) compared to neat Pebax and Pebax/PEGDA blended membranes. The Pebax/XLPEGDA formed interpenetrating polymer networks, whereas the other membranes did not have the interpenetrating polymer networks. Therefore, the increase in tensile strength was attributed to the interpenetrating polymer networks. The interpenetrating polymer networks could potentially enhance membrane mechanical resistance to creep and plasticization under real world industrial feed streams.

TABLE 2

Mechanical Properties of Three Polymer Membranes

| Membranes | Tensile stress (Mpa) | Tensile strain (%) | Young's Modulus (Mpa) |
|---|---|---|---|
| Pebax | 12.70 ± 1.71 | 470.70 ± 16.80 | 89.00 ± 4.70 |
| Pebax/PEGDA | 9.77 ± 1.20 | 391.54 ± 13.20 | 44.24 ± 3.50 |
| Pebax/XLPEGDA | 19.22 ± 1.50 | 182.42 ± 12.80 | 61.65 ± 6.40 |

Figure 3A:
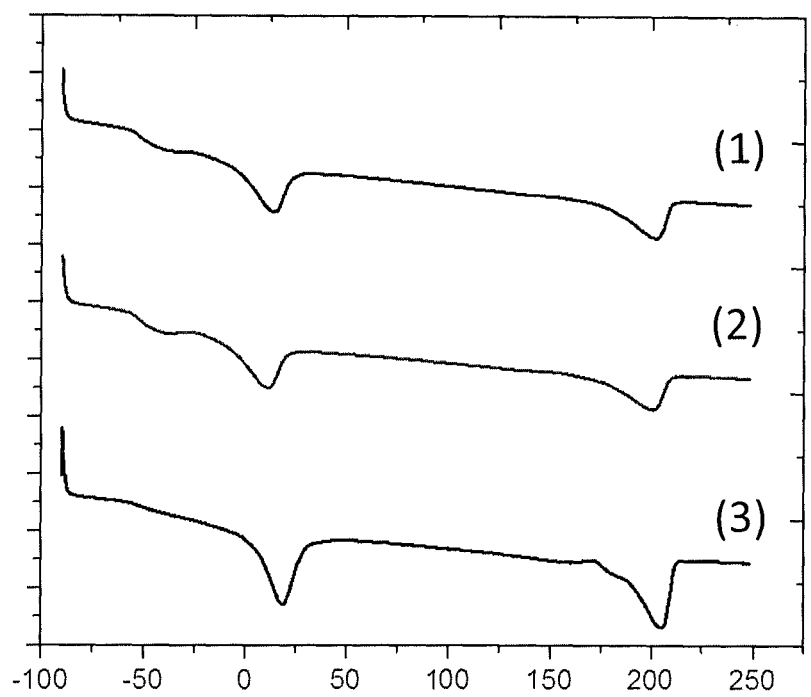
Figure 3B:
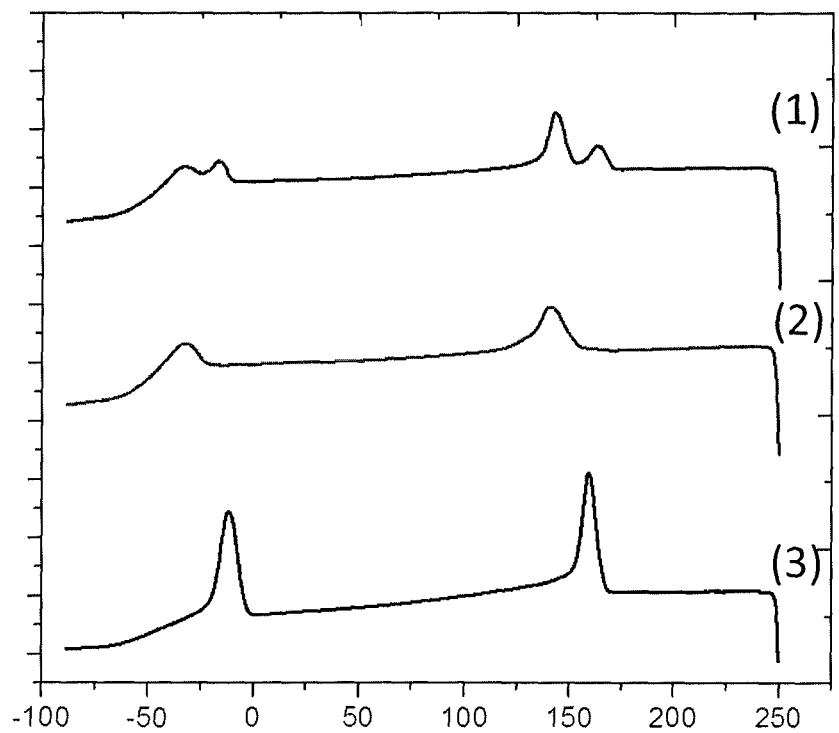

The membrane thermal properties were characterized by Differential Scanning calorimetry (DSC). The thermographs, FIG. 3A (the heating curves) and FIG. 3B (cooling curves) of neat Pebax and the prepared blended membranes were shown in FIGS. 3A-3B. Glass transition temperature ($T_g$), melting temperature ($T_m$) of polyamide hard (PA) and polyether soft (PE) segments of neat Pebax and the prepared blended membranes are shown in Table 3. Compared to neat Pebax membrane, which had a glass transition temperature ($T_g$) of −51.01° C., the addition of PEGDA into Pebax membrane led to reduction of $T_g$, to −53.05° C. Without being bound by theory, the decrease in $T_g$ was believed to be the result of an increase in chain mobility caused by PEGDA. Similarly, $T_g$ for Pebax/XLPEGDA blended membranes reduced to −53.97° C. after PEGDA was crosslinked in the Pebax matrix. The addition of PEGDA into Pebax matrix also led to reduction in melting temperatures ($T_m$) of both hard and soft segments of Pebax. In addition, incorporation of PEGDA into the Pebax membrane matrix decreases crystallinity ($X_c$) for both hard and soft segments. The reduction in crystal content of blended membranes was attributed to intermolecular interactions between Pebax and PEGDA which prevented polymer chains from forming H-bonds in their hard segments (see FIGS. 1A-1C).

TABLE 3

Thermal Properties of Three Polymer Membranes

| Membranes | $T_g$ (° C.) | $T_m$ (PE) (° C.) | $T_m$ (PA) (° C.) | $X_c$ (PE) (%) | $X_c$ (PA) (%) |
|---|---|---|---|---|---|
| Neat Pebax membrane | −51.10 | 18.79 | 205.48 | 28.16 | 27.50 |
| Pebax/PEGDA blended membrane | −53.05 | 8.51 | 201.84 | 14.83 | 19.48 |
| Pebax/XLPEGDA blended membrane | −53.97 | 14.16 | 202.10 | 20.42 | 19.75 |

As previously described, the shift for the —N—H—C=O and —N—H peaks of Pebax/PEGDA blend membrane to the lower wavenumbers at 1724 cm−1 and 3300 cm−1 in the FTIR-ATR spectra (FIGS. 1A and 1B), compared to neat Pebax membrane at 1732 cm−1 and 3302 cm−1 proved elimination of hydrogen bonding, and consequently reduction of crystallinity in the Pebax/PEGDA blended membrane (Table 3). However, after UV crosslinking of PEGDA in Pebax matrix, —N—H—C=O characteristic peak of Pebax/XLPEGDA blended membrane shifted back to 1732 $cm^{-1}$), indicating intramolecular hydrogen bonding between hard and soft segments in Pebax recovered. Further, N—H characteristic peak shifts to much higher wavenumbers, from 3302 $cm^{-1}$ for Pebax to around 3308 $cm^{-1}$ for Pebax/XLPEGDA, presumably due to the formation of new hydrogen bonding in the Pebax/XLPEGDA blended membranes. Thereby, crosslinked PEGDA in Pebax matrix shows less plasticizer behavior, as compared to uncrosslinked PEGDA in Pebax matrix, that leads to strengthening hydrogen bonding and increased crystallinity in Pebax/XLPEGDA membranes.

Figure 4A:
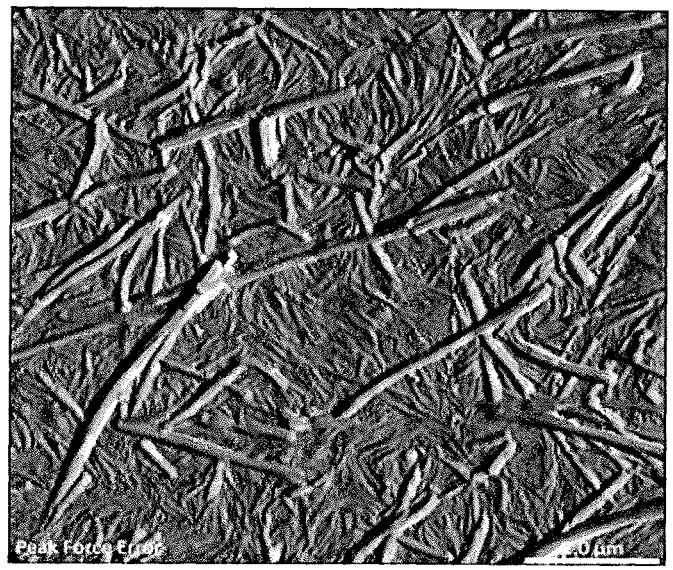
FIG. 4A is an Atomic Force Microscopy (AFM) micrograph of a neat Pebax® membrane.
Figure 4B:
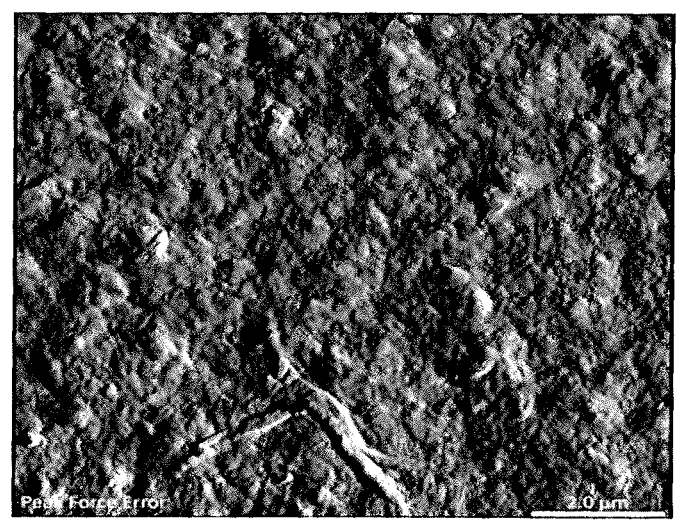
FIG. 4B is an AFM micrograph of a PEBA/XLPEGDA membrane.

The surface morphologies of neat Pebax (FIG. 4A) and Pebax/XLPEGDA (FIG. 4B) blended membranes were observed by atomic force microscopy (AFM). The nanostructure observed in Pebax/XLPEGDA blended membrane was less organized as evidence by the smaller nanofibers when compared with the neat Pebax. The decrease in organization indicated an increase in the polymer chain mobility, so that the formation of the microphase separated nanostructure was more pronounced.

Figure 5:
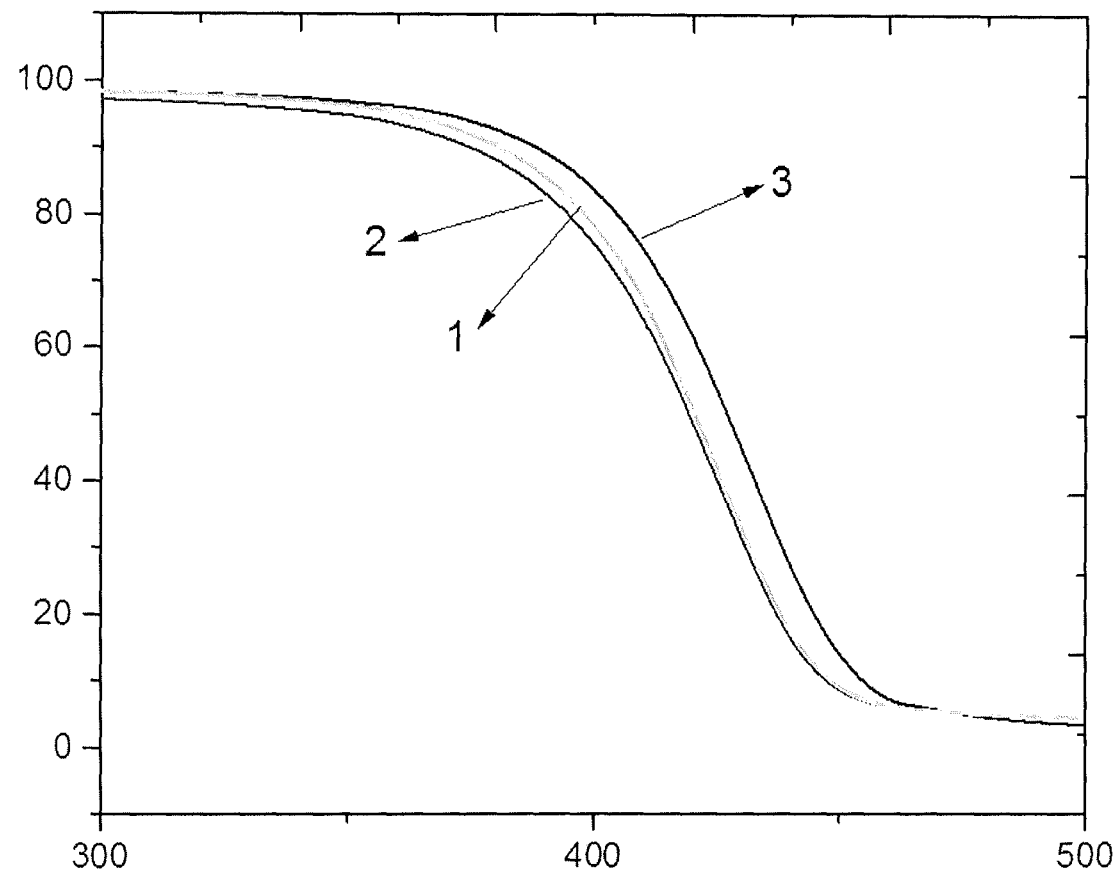
FIG. 5 is Thermogravimetric Analyzer (TGA) thermograms of the percent weight loss as a function of temperature in degrees Celsius of: (3) neat Pebax®; (2) Pebax®/PEGDA; and (1) Pebax®/XLPEGDA membranes.

The thermal stability of neat Pebax, Pebax/PEGDA and Pebax/XLPEGDA blended membranes was measured with Thermogravimetric Analyzer (TGA) and the TGA results are presented in FIG. 5. Both of the modified Pebax membranes, Pebax/PEGDA and Pebax/XLPEGDA blended membranes, had a one-step degradation pattern at temperature around 377-392° C., which exhibited stability greater than 300° C., which is sufficient for industrial applications.

TABLE 4

Thermal Stability of Three Polymer Membranes

| Membranes | Onset temp. (° C.) | Temp. at 5% weight loss (° C.) | Temp. at 10% weight loss (° C.) | Residue (%) at 600° C. |
|---|---|---|---|---|
| Neat Pebax membrane | 404.10 | 369.50 | 388.40 | 2.52 |
| Pebax/PEGDA blended membrane | 392.10 | 348.40 | 374.90 | 2.97 |
| Pebax/XLPEGDA blended membrane | 379.30 | 345.00 | 367.50 | 4.30 |

The overall thermal stability of modified Pebax membranes (Pebax/PEGDA and Pebax/XLPEGDA membranes) was slightly lower than that of neat Pebax membrane, as shown in Table 4. The onset degradation temperature at 5% and 10% weight loss temperature of the Pebax/PEGDA membrane and Pebax/XLPEGDA membrane showed a decrease after UV crosslinking. The decrease in onset degradation was further evidence of interpenetrated networks in the Pebax/XLPEGDA membrane. The residual weight at higher temperature (600° C.) increased with increase in PEGDA content after UV crosslinking, as the result of a high amount of crosslinked PEGDA network.

The membrane permeability and ideal selectivity for $CO_2/CH_4$ ($\alpha_{CO_2/CR_4}$) of neat Pebax, Pebax/PEGDA and Pebax/XLPEGDA blended membranes were measured, and the results were recorded in Table 5. The pure gas measurements were recorded at 25° C. with the feed pressure of 100 psi. The presence of PEGDA in the Pebax matrix means higher content of EO units in the system, therefore, the polar ether oxygen in EO units interacts favorably with $CO_2$.

TABLE 5

Pure Gas Permeation for Three Polymer Membranes

| Membranes | Sample# | $P_{CO_2}$ (Barrer) | $P_{CH_4}$ (Barrer) | $\alpha_{CO_2/CH_4}$ |
|---|---|---|---|---|
| Neat Pebax membrane | 3 | 60.59 | 2.61 | 23.21 |
| Pebax/PEGDA blended membrane | 2 | 128.89 | 6.94 | 18.57 |
| Pebax/XLPEGDA blended membranes | 1A | 82.55 | 3.29 | 25.06 |
|  | 1B | 146.28 | 5.05 | 28.97 |
|  | 1C | 75.27 | 3.007 | 25.03 |
|  | 1D | 122.14 | 5.06 | 24.14 |
|  | 1E | 109.98 | 4.17 | 26.37 |
|  | 1F | 93.76 | 3.29 | 28.50 |

The results in Table 5 indicated that the permeability of $CO_2$ in Pebax matrix is higher than that of neat Pebax membrane under the same feed pressure with an addition of PEGDA, but the $CO_2/CH_4$ selectivity of Pebax/PEGDA membrane decreased. However, the Pebax/XLPEGDA membranes had superior $CO_2$ permeability having a 36% to 140% greater than compared to neat Pebax and improved $CO_2/CH_4$ selectivity of 8% to 25% as compared to neat Pebax membrane. The increase of separation performance, $CO_2$ permeability and $CO_2/CH_4$ selectivity, was presumably due to the change of the chain mobility and chain packing in membrane matrix after UV crosslinking.

Figure 6:
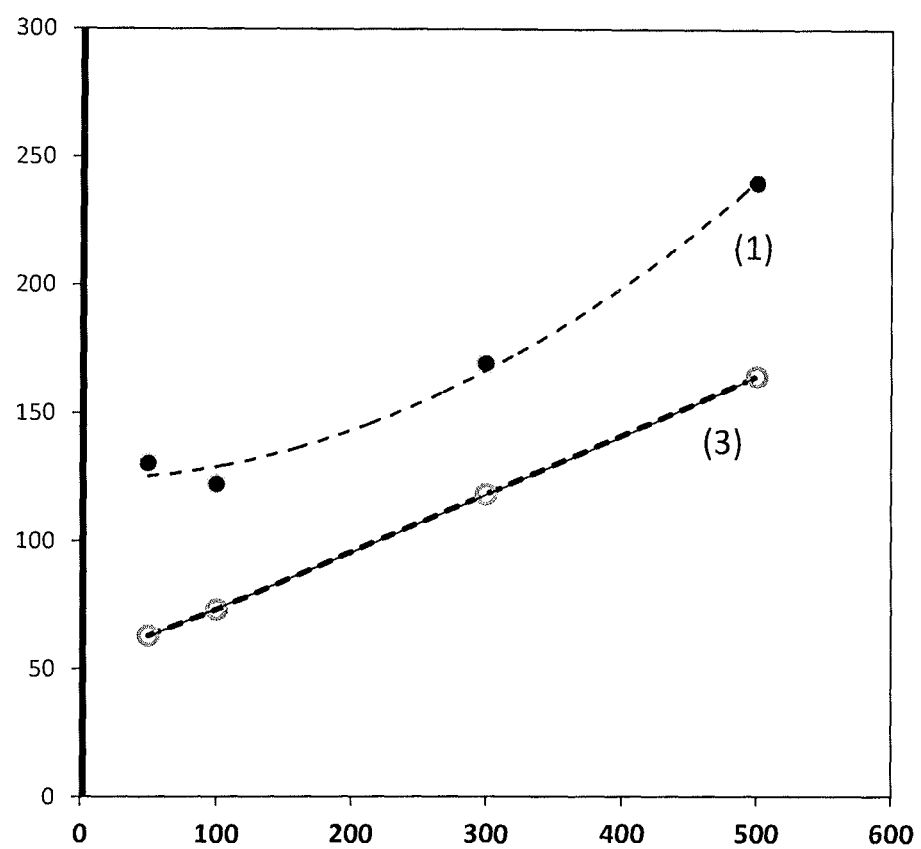
FIG. 6 is a graph of $CO_2$ permeability (Barrer) of (3) neat Pebax® and (1) Pebax®/XLPEGDA membranes versus the feed pressure (50 pounds per square inch (psi) to 500 psi).
Figure 7:
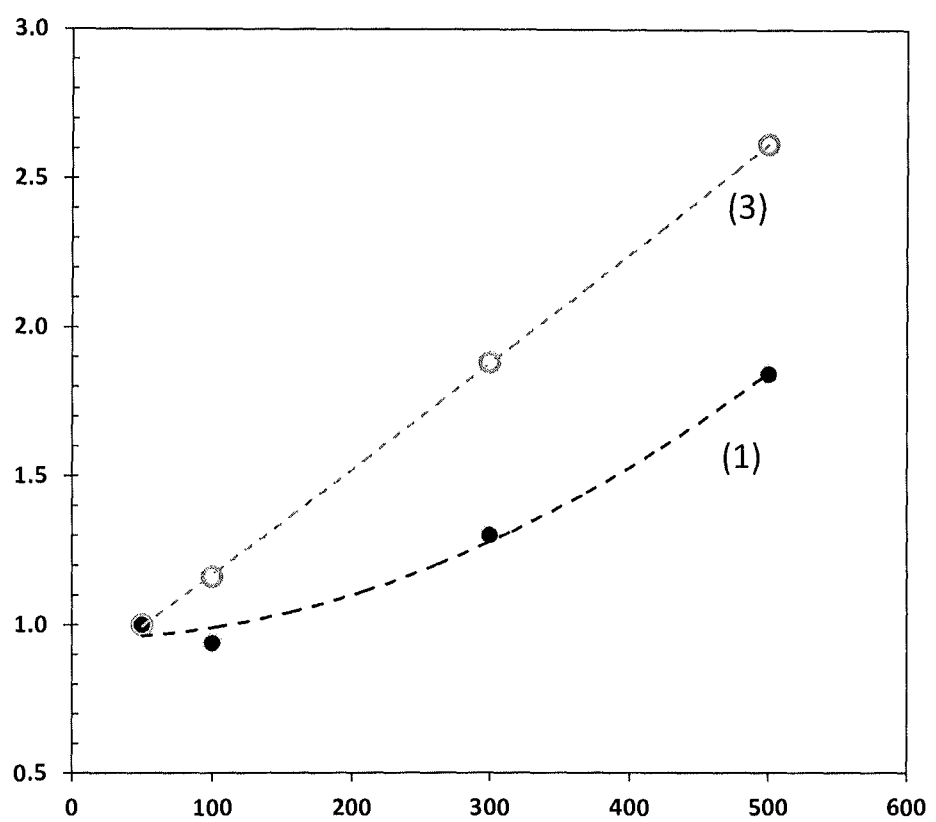
FIG. 7 is a graph of relative $CO_2$ permeability ($P_p/P_{50\ psi}$) versus the feed pressure (50 psi to 500 psi), in which the relative $CO_2$ permeability equals the permeability at given pressure divided by the permeability at 50 psi.

To study the plasticization resistance of Pebax XLPEGDA membranes, the membranes were conditioned with $CO_2$ at different pressures (from 50 to 500 psi). Generally, the $CO_2$ permeability increased with the increase of the feed pressure, due to the polymer plasticization at higher pressure; this trend was evident in FIG. 6. The change of $CO_2$ relative permeability ($P_p/P_{50\,psi}$) with the increase of the applied $CO_2$ pressure at 25° C. was studied and used to relatively compare the membrane plasticization resistance. In FIG. 7, the neat Pebax membrane exhibited 88% and 160% increase in $CO_2$ permeability under the feed pressure of 300 psi and 500 psi compared to that under the $CO_2$ feed pressure of 50 psi. This significant $CO_2$ permeability increase at higher $CO_2$ feed pressure is due to the $CO_2$ plasticization of Pebax block copolymer. However, only about 30% and 84% increase in $CO_2$ permeability was observed for Pebax/XLPEGDA membrane at $CO_2$ feed pressure of 300 psi and 500 psi compared to that under 50 psi, indicating that Pebax/XLPEGDA membranes demonstrated significant enhancement in $CO_2$ plasticization resistance as compared to neat Pebax membranes. This enhancement may be attributed to the formation of interpenetrating network structures in the blended membrane matrix.

The $CO_2$ permeability and the plasticization resistance were further evident by the results recorded in Table 6. In Table 6, the $CO_2$ permeability and ideal selectivity for $CO_2/CH_4$ ($\alpha_{CO_2/CH_4}$) of neat Pebax and Pebax/XLPEGDA blended membrane were measured at various pressures, and the results were recorded.

TABLE 6

Mixed gas permeation for Pebax/XLPEGDA and Pebax

| | $P_{CO_2}$ (Barrer) | | | $\alpha_{CO_2}/CH_4$ | | |
|---|---|---|---|---|---|---|
| | 200 psi | 500 psi | 800 psi | 200 psi | 500 psi | 800 psi |
| Pebax | 48.8 | 56.1 | 61.2 | 13.1 | 11.7 | 10.7 |
| Pebax/ XLPEGDA | 83.9 | 79.2 | 83.8 | 15.7 | 15.4 | 13.9 |

The results in Table 6 indicated that the $CO_2$ permeability for the Pebax/XLPEGDA membrane remained constant and higher than the neat Pebax, which plasticized over time as indicated by the increase in permeability as pressure was increased. Additionally, the Pebax/XLPEGDA blended membranes showed a significant improvement in $CO_2/CH_4$ mixed gas selectivity when compared to neat Pebax.

Figure 8A:
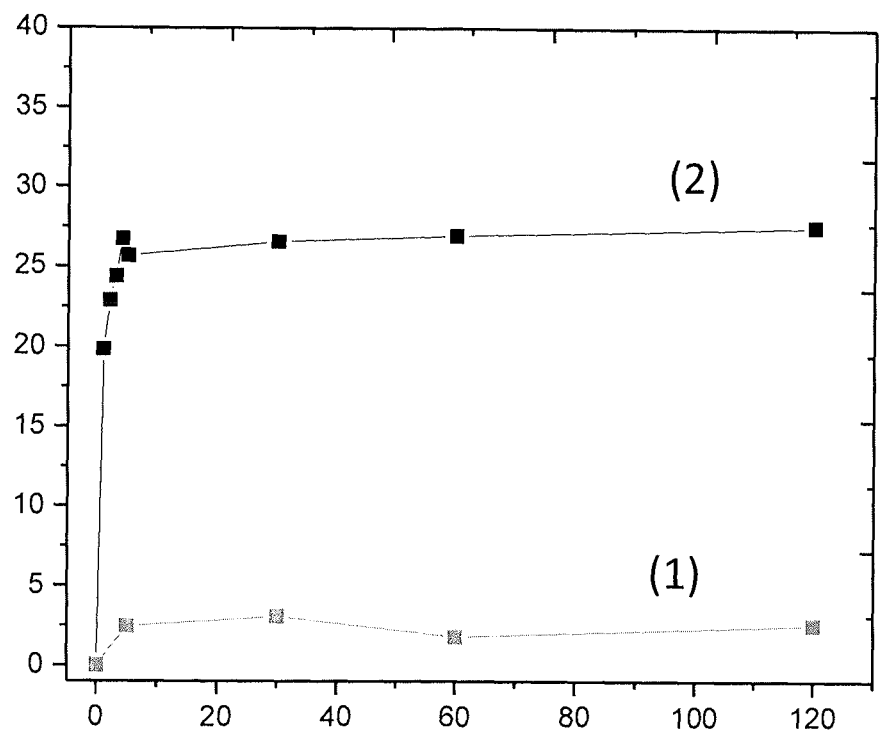
FIG. 8A is a curve of swelling resistance of percent weight loss as a function of time in minutes of: (2) Pebax®/PEGDA; and (1) Pebax®/XLPEGDA membranes in water.
Figure 8B:
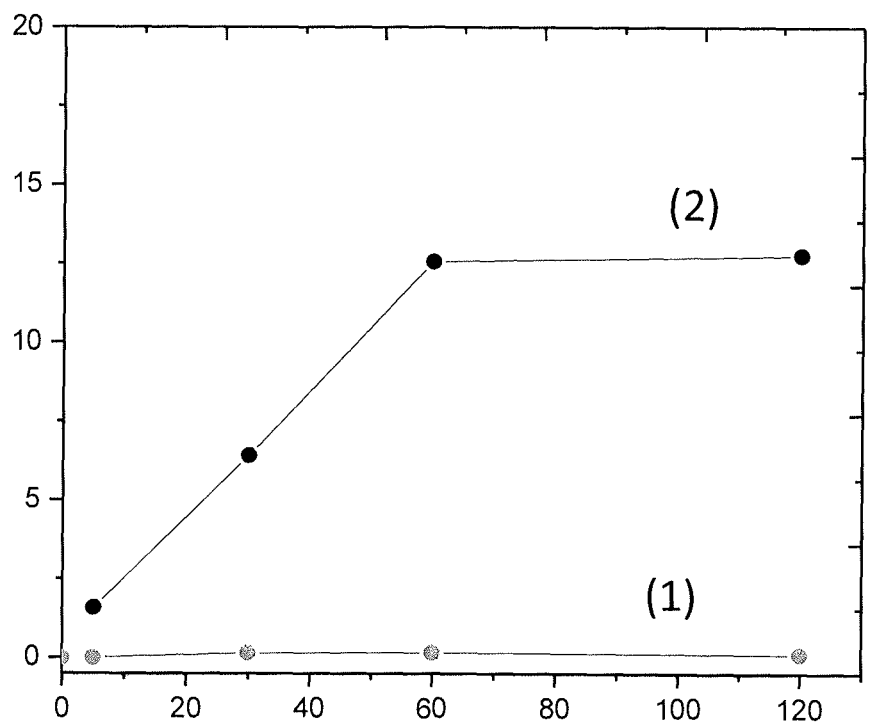
FIG. 8B is a curve of swelling resistance of percent weight loss as a function of time in minutes of: (2) Pebax®/PEGDA; and (1) Pebax®/XLPEGDA membranes in hexane.

In lab tests, as well as real world wet gas streams, low molecular weight PEG polymer strands (for example polymers with less than 100,000 molecular weight) are leeched out of the swelled polymer matrix causing membranes lose weight. In FIGS. 8A and 8B, chemical stability of the membranes in wet feed conditions were tested by swelling tests in water and hexane. These tests showed that the Pebax/XLPEGDA membranes had a greater than 100% reduction in weight loss than the uncrosslinked membranes, Pebax/PEGDA, and in some cases up to 1000% reduction in weight loss. Since the Pebax/XLPEGDA membranes have an interpenetrating network, the low molecular weight PEG strands were not leeched from the membrane matrix. Therefore, the crosslinking procedure significantly reduced leeching under these conditions. This could lead to the sustainable operating flux.

Figure 9:
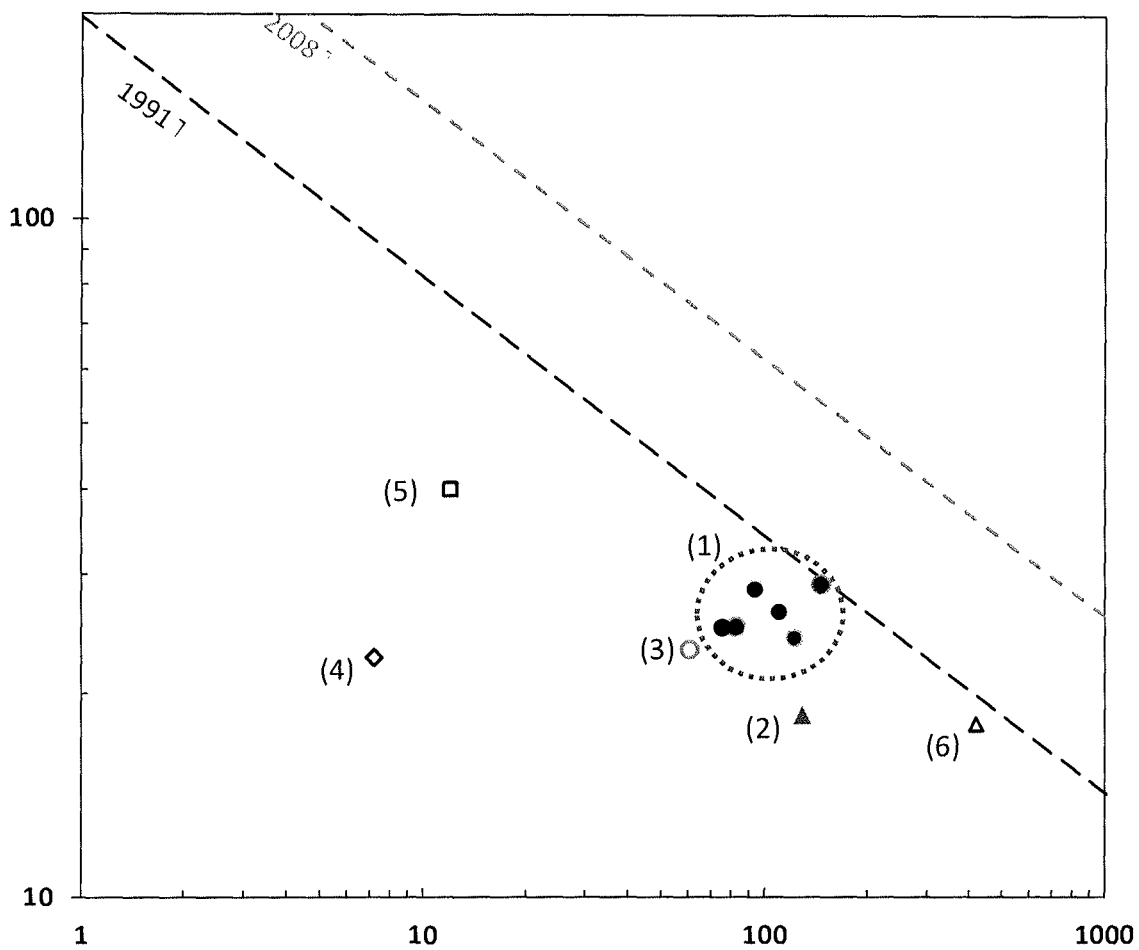
FIG. 9 is a scattered plot graph of the $CO_2/CH_4$ separation performance of: (1) Pebax®/XLPEGDA membranes; (2) the Pebax®/PEGDA; (3) neat PEBA; (4) commercially available cellulose acetate (CA) polymer; (5) polyimide (6FDI-mPD); and (6) XLPEO (crosslinked poly(ethylene oxide).

The $CO_2/CH_4$ separation performance was studied by comparing neat Pebax, Pebax/PEGDA, and Pebax/XLPEGDA membranes to two glassy polymer membranes, a cellulose acetate (CA), and polyimide (6FDI-mPD), and one rubbery membrane, XLPEG. The results of the separation performance are shown in FIG. 9. The results demonstrated that Pebax/XLPEGDA membranes have a better performance compared with the other membranes and can be used for sour gas separation.

The subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

What is claimed is:

1. A method of separating gas, the method comprising:
flowing a gas stream through a membrane, in which the membrane consists essentially of a composition of poly(ether-b-amide) copolymer and crosslinked acrylate-terminated poly(ethylene glycol) according to formula (I) or formula (II):

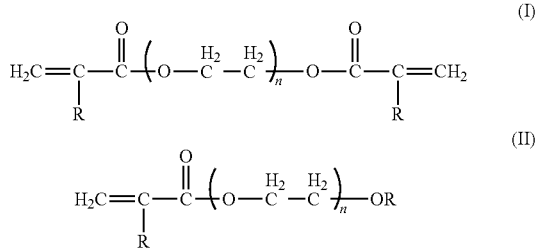

where each n is of from 2 to 30; and each R is independently —H or —CH$_3$; and
separating the gas stream via the membrane.

2. The method according to claim 1, in which poly(ether-b-amide) copolymer comprises a soft segment of from 60% to 80% by weight and a hard segment of from 40% to 20% by weight.

3. The method according to claim 1, in which the gases separated are methane and carbon dioxide.

4. The method according to claim 3, in which the carbon dioxide is at least 24 times more permeable through the gas separation membrane than methane.

5. A method of making a gas separation membrane consisting essentially of
dissolving poly(ether-b-amide) copolymer, acrylate-terminated poly(ethylene glycol) according to formula (I) or formula (II), and a photoinitiator in a solvent to form a polymer solution:

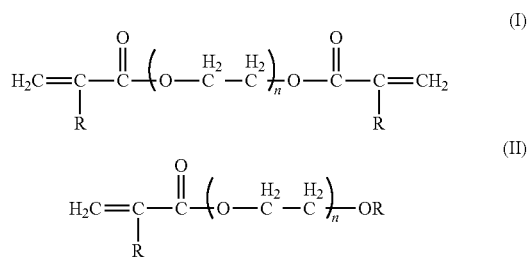

casting the polymer solution into a mold;
removing the solvent to form a film; and
exposing the film to a photoactivator to crosslink acrylate-terminated poly(ethylene glycol) according to formula (I) or formula (II) to form the gas separation membrane.

6. The method according to claim 5, further comprising removing the film from the mold.

7. The method according to claim 5, further comprising curing the gas separation membrane.

8. The method according to claim 5, in which poly(ether-b-amide) copolymer comprises a soft segment of from 60% to 80% by weight and a hard segment of from 40% to 20% by weight.

9. The method according to claim 5, in which the photoinitiator comprises 1-hydroxycyclohexyl phenyl ketone (HCPK), benzophenone or combinations thereof.

10. The method according to claim 9, in which the photoinitiator is in amounts of from 0.5 wt. % to 4.0 wt. % based on the weight of the acrylate-terminated poly(ethylene glycol).

11. The method according to claim 5, in which the polymer solution is formed at a temperature from 70° C. to 100° C.

12. The method according to claim 5, in which the polymer solution is casted at a temperature from 30° C. to 80° C.

13. The method according to claim 5, in which the film is exposed to exposed to ultraviolet light at a wavelength of from 300 nm to 350 nm for a time of from 30 seconds to 300 seconds.

14. The method according to claim 5, in which the solvent comprises a mixture of water and alcohol.

15. The method according to claim 5, in which the polymer solution comprises from 1 wt. % to 10 wt. % polyether block amide copolymer.

* * * * *

UNITED STATES PATENT AND TRADEMARK OFFICE
CERTIFICATE OF CORRECTION

PATENT NO. : 10,525,406 B2
APPLICATION NO. : 15/608403
DATED : January 7, 2020
INVENTOR(S) : Junyan Yang It is certified that error appears in the above-identified patent and that said Letters Patent is hereby corrected as shown below:

In the Specification

In Column 2, Line(s) 47 & 48, delete "Differential Scanning calorimetry" and insert --Differential Scanning Calorimetry--, therefor.

In the Claims

In Column 12, Line 55, delete "exposed to exposed to" and insert --exposed to--, therefor.

Signed and Sealed this
Eleventh Day of August, 2020

Andrei Iancu
*Director of the United States Patent and Trademark Office*